(12) United States Patent
Tang et al.

(10) Patent No.: US 9,710,697 B2
(45) Date of Patent: Jul. 18, 2017

(54) METHOD AND SYSTEM FOR EXACTING FACE FEATURES FROM DATA OF FACE IMAGES

(71) Applicant: Beijing SenseTime Technology Development Co., Ltd., Beijing (CN)

(72) Inventors: Xiaoou Tang, Hong Kong (CN); Zhenyao Zhu, Hong Kong (CN); Ping Luo, Hong Kong (CN); Xiaogang Wang, Hong Kong (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 0 days.

(21) Appl. No.: 15/100,019

(22) PCT Filed: Nov. 30, 2013

(86) PCT No.: PCT/CN2013/088253
§ 371 (c)(1),
(2) Date: May 27, 2016

(87) PCT Pub. No.: WO2015/078017
PCT Pub. Date: Jun. 4, 2015

(65) Prior Publication Data
US 2017/0004353 A1    Jan. 5, 2017

(51) Int. Cl.
*G06K 9/00*    (2006.01)
*G06K 9/62*    (2006.01)

(52) U.S. Cl.
CPC ..... *G06K 9/00228* (2013.01); *G06K 9/00268* (2013.01); *G06K 9/6232* (2013.01); *G06K 9/6249* (2013.01)

(58) Field of Classification Search
CPC ........... G06K 9/00228; G06K 9/00268; G06K 9/6232; G06K 9/6249

(Continued)

(56) References Cited

U.S. PATENT DOCUMENTS

2007/0133878 A1*  6/2007  Porikli ................. G06K 9/4642
                                                   382/190
2009/0297046 A1   12/2009  Zhao et al.

FOREIGN PATENT DOCUMENTS

CN    101968850 A    2/2011
CN    103198292 A    7/2013

OTHER PUBLICATIONS

Huang et al., "Learning Hierarchical Representatives for Face Verification with Convolutional Deep Beliefs Networks," *CVPR*, Dec. 31, 2012, Sections 1-5.

(Continued)

*Primary Examiner* — Amandeep Saini
(74) *Attorney, Agent, or Firm* — Kilpatrick Townsend & Stockton LLP

(57) ABSTRACT

A method and a system for exacting face features from data of face images have been disclosed. The system may comprise: A first feature extraction unit configured to filter the data of face images into a first plurality of channels of feature maps with a first dimension and down-sample the feature maps into a second dimension of feature maps; a second feature extraction unit configured to filter the second dimension of feature maps into a second plurality of channels of feature maps with a second dimension, and to down-sample the second plurality of channels feature maps into a third dimension of feature maps; and a third feature extraction unit configured to filter the third dimension of feature maps so as to further reduce high responses outside the face region such that reduce intra-identity variances of face images, while maintain discrimination between identities of the face images.

12 Claims, 4 Drawing Sheets

(58) Field of Classification Search
USPC .......................................................... 382/118
See application file for complete search history.

(56) References Cited

OTHER PUBLICATIONS

Jia et al., "Image transformation Based on Learning Dictionaries Across Image Spaces," *IEEE Transactions on Pattern Analysis and Machine Intelligence*, vol. 35, No. 2, Feb. 28, 2013, Sections 1-9.
Le et al., "Tiled Convolutional Neural Networks," *NIPS*, Dec. 31, 2010, Sections 1-7.
Zeiler et al., "Adaptive Deconvolutional Networks for Mid and High Level Feature Learning," *ICCV*, Dec. 31, 2011, Sections 1-5.
International Search Report and Written Opinion of PCT/CN2013/088253, mailed Sep. 19, 2014.
Abdi, "Discriminant Correspondence Analysis," *Encyclopedia of measurement and statistics* (2007): 270-275.
Ahonen et al., "Face Description with Local Binary Patterns: Application to Face Recognition," *IEEE Transactions on Pattern Analysis and Machine Intelligence*, vol. 12, No. 8, Dec. 2006, pp. 2037-2041.
Asthana et al., "Fully Automatic Pose-Invariant Face Recognition via 3D Pose Normalization," *2011 IEEE International Conference on Computer Vision*, pp. 937-944, IEEE.
Cao et al., "Face Recognition with Learning-Based Descriptor," *In Computer Vision and Pattern Recognition (CVPR), 2010 IEEE Conference on*, pp. 2707-2714. IEEE, 2010.
Castillo, et al., "Wide-Baseline Stereo for Face Recognition with Large Pose Variation," *In Computer Vision and Pattern Recognition (CVPR), 2011 IEEE Conference on*, pp. 537-544. IEEE, 2011.
Chopra, et al., "Learning a Similarity Metric Discriminatively, with Application to Face Verification," 2005. *CVPR 2005. IEEE Computer Society Conference on*, vol. 1, pp. 539-546. IEEE, 2005.
Gross et al, "Multi-PIE," *Image and Vision Computing 28*, No. 5 (2010): 807-813.
Guo et al., "Descriptor Learning Based on Fisher Separation Criterion for Texture Classification," *In Computer Vision—ACCV 2010*, pp. 185-198. Springer Berlin Heidelberg, 2010.
Hinton et al., "A Fast Learning Algorithm for Deep Believe Nets," *Neural Computation* 18, No. 7 (2006): 1527-1554.
Huang et al., "Learning Hierarchical Representation for Face Verification with Convolutional Deep Belief Networks," *In Computer Vision and Pattern Recognition (CVPR), 2012 IEEE Conference on*, pp. 2518-2525. IEEE, 2012.
Jolliffe, "Principal Component Analysis," Second Edition, Springer, 2008.
Krizhevsky, et al., "Imagenet classification with deep convolutional neural networks." *In Advances in neural information processing systems*, pp. 1097-1105.
Le, et al., "Tiled convolutional neural networks." (Downloaded from: http://ai.stanford.edu/~ang/papers/nips10-TiledConvolutionalNeuralNetworks.pdf.).
Lecun, et al. "Gradient-based learning applied to document recognition." Proceedings of the IEEE 86, No. 11 (1998): 2278-2324.
Lee, et al., "Convolutional deep belief networks for scalable unsupervised learning of hierarchical representations." *In Proceedings of the 26th Annual International Conference on Machine Learning*, pp. 609-616. ACM, 2009.
Lei, et al., "Discriminant image filter learning for face recognition with local binary pattern like representation." *In Computer Vision and Pattern Recognition (CVPR), 2012 IEEE Conference on*, pp. 2512-2517. IEEE, 2012.
Li, et al., "Coupled bias—variance tradeoff for cross-pose face recognition." *Image Processing, IEEE Transactions on 21*, No. 1 (2012): 305-315.
Li, et al., "Morphable displacement field based image matching for face recognition across pose." *In Computer Vision—ECCV 2012*, pp. 102-115. Springer Berlin Heidelberg, 2012.
Nair, et al., "Rectified linear units improve restricted boltzmann machines." *In Proceedings of the 27th International Conference on Machine Learning* (ICML-10), pp. 807-814. 2010.
Qian, "On the Momentum Term in Gradient Descent Learning Algorithms," *Neural Networks 12* (1999), 145-151.
Ranzato, et al., "On deep generative models with applications to recognition." *In Computer Vision and Pattern Recognition (CVPR), 2011 IEEE Conference on*, pp. 2857-2864. IEEE, 2011.
Salakhutdinov, et al., "Deep boltzmann machines." *In International conference on artificial intelligence and statistics*, pp. 448-455. 2009.
Schroff, et al., "Pose, illumination and expression invariant pairwise face-similarity measure via doppelgänger list comparison." *In Computer Vision (ICCV), 2011 IEEE International Conference on*, pp. 2494-2501. IEEE, 2011.
Sun, et al., "Hybrid deep learning for face verification." *In Proceedings of the IEEE International Conference on Computer Vision*, pp. 1489-1496. 2013.
Tang, et al., "Face sketch recognition." Circuits and Systems for Video Technology, *IEEE Transactions on 14*, No. 1 (2004): 50-57.
Wang, et al. "Dual-space linear discriminant analysis for face recognition." In Computer Vision and Pattern Recognition, 2004. *CVPR 2004. Proceedings of the 2004 IEEE Computer Society Conference on*, vol. 2, pp. II-564. IEEE, 2004.
Wagner, et al., "Toward a practical face recognition system: Robust alignment and illumination by sparse representation." *Pattern Analysis and Machine Intelligence, IEEE Transactions on 34*, No. 2 (2012): 372-386.
Wang, et al., "A unified framework for subspace face recognition." Pattern Analysis and Machine Intelligence, *IEEE Transactions on 26*, No. 9 (2004): 1222-1228.
Wang, et al., "Random sampling for subspace face recognition." *International Journal of Computer Vision 70*, No. 1 (2006): 91-104.
Wang, et al., "Face photo-sketch synthesis and recognition." *Pattern Analysis and Machine Intelligence, IEEE Transactions on 31*, No. 11 (2009): 1955-1967.
Wiskott, et al., "Face Recognition by Elastic Bunch Graph Matching," *In Intelligent Biometric Techniques in Fingerprint and Face Recognition*, eds. L.C. Jain et al., publ. CRC Press, ISBN 0-8493-2055-0, Chapter 11, pp. 355-396, (1999).
Wright, et al., "Robust face recognition via sparse representation." *Pattern Analysis and Machine Intelligence, IEEE Transactions on 31*, No. 2 (2009): 210-227.
Zeiler, et al., "Adaptive deconvolutional networks for mid and high level feature learning." *In Computer Vision (ICCV), 2011 IEEE International Conference on*, pp. 2018-2025. IEEE, 2011.
Zhang, et al., "Local gabor binary pattern histogram sequence (lgbphs): A novel non-statistical model for face representation and recognition." *In Computer Vision, 2005. ICCV 2005. Tenth IEEE International Conference on*, vol. 1, pp. 786-791. IEEE, 2005.
Zhang, et al., "Coupled information-theoretic encoding for face photo-sketch recognition." *In Computer Vision and Pattern Recognition (CVPR), 2011 IEEE Conference on*, pp. 513-520. IEEE, 2011.
Zhang, et al., "Face recognition across pose: A review." *Pattern Recognition 42*, No. 11 (2009): 2876-2896.
Jia, et al., "Image transformation based on learning dictionaries across image spaces." *Pattern Analysis and Machine Intelligence, IEEE Transactions on 35*, No. 2 (2013): 367-380.
Office action dated Dec. 6, 2016 in JP 2016-549802.
Okatani, "Deep Learning for Image Recognition," Deep Learning, 4, 2013, 962-974.

\* cited by examiner

METHOD AND SYSTEM FOR EXACTING FACE FEATURES FROM DATA OF FACE IMAGES

TECHNICAL FIELD

The present application refers to a method and a system for exacting face features from data of face images.

BACKGROUND

In many practical applications, the pose and illumination changes become the bottleneck for face recognition. Many existing works have been proposed to account for such variations. The pose-invariant methods may be generally separated into two categories: 2D-based and 3D-based. In the first category, poses are either handled by 2D image matching or by encoding a test image using some bases or exemplars. For example, in one conventional way, stereo matching is used to compute the similarity between two faces. a test face combination of training images is represented, and then the linear regression coefficients are utilized as features for face recognition. 3D-based methods usually capture 3D face data or estimate 3D models from 2D input, and try to match them to a 2D probe face image. Such methods make it possible to synthesize any view of the probe face, which makes them generally more robust to pose variation.

The illumination-invariant methods typically make assumptions about how illumination affects the face images, and use these assumptions to model and remove the illumination effect. For example, in the art, it has been designed a projector-based system to capture images of each subject in the gallery under a few illuminations, which can be linearly combined to generate images under arbitrary illuminations. With this augmented gallery, they adopted sparse coding to perform face recognition.

The above methods have certain limitations. For example, capturing 3D data requires additional cost and resources. Inferring 3D models from 2D data is an ill-posed problem. As the statistical illumination models are often summarized from controlled environment, they cannot be well generalized in practical applications.

SUMMARY

In one aspect, the present application provides a method for exacting face features from data of face images, comprising:

1) filtering the data of face images into a first plurality of channels of feature maps with a first dimension;
2) computing each of the maps by rule of $\sigma(x)=\max(0,x)$, where x represents feature maps with the first dimension;
3) down-sampling the computed feature maps into a second dimension of feature map;
4) filtering the down-sampled maps into a second plurality of channels of feature maps with a second dimension;
5) computing each of the maps with the second dimension by rule of $\sigma(x)=\max(0,x)$, where x represents the second plurality of channels of feature maps;
6) down-sampling the computed second plurality of channels feature maps into a third dimension of feature maps;
7) filtering each map of the third dimension of feature maps so as to reduce high responses outside the face region, whereby, intra-identity variances of the face images are reduced and discrimination between identities of the face images are maintained.

In another aspect, the present application provides a system for exacting face features from data of face images, comprising:

a first feature extraction unit configured to filter the data of face images into a first plurality of channels of feature maps with a first dimension and down-sample the feature maps into a second dimension of feature maps;

a second feature extraction unit configured to filter the second dimension of feature maps into a second plurality of channels of feature maps with a second dimension, and to down-sample the second plurality of channels feature maps into a third dimension of feature maps;

a third feature extraction unit configured to filter the third dimension of feature maps so as to further reduce high responses outside the face region such that reduce intra-identity variances of face images, while maintain discrimination between identities of the face images.

In one embodiment, the method may be implemented or carried out by one or more processor in the computer.

In one embodiment, the first feature extraction unit comprises a first matrix of filters, a first non-linear activation unit and a first matrix of down-sampling units. The first matrix of filters are configured to filter the data of face image such that each of the maps has a large number of high responses outside the face region, which mainly capture pose information of the face image, and a plurality of high responses inside the face region, which capture face structures of the face image. The first matrix of down-sampling units is configured to down-sample the feature maps into the second dimension of feature maps. The first non-linear activation unit is configured to non-linearly couple the first matrix of filters and the first matrix of down-sampling units.

In further embodiment, the second feature extraction unit comprises a second matrix of filters 21 are configured to filter each of the maps from the first feature extraction unit so as to reduce high responses outside the face region such that most pose variations are discarded while the face structures of the face image is retained. The second feature extraction unit further comprises: a second non-linear activation unit; and a second matrix of down-sampling units configured to down-sample the feature maps into the second dimension of feature maps, wherein the second non-linear activation unit is configured to non-linearly couple the second matrix of filters and the second matrix of down-sampling units.

In further aspect, the present application provides a computer-readable media for storing the instructions to:

1) filter the data of face images into a first plurality of channels of feature maps with a first dimension;
2) compute each of the maps by rule of $\sigma(x)=\max(0,x)$, where x represents feature maps with the first dimension;
3) down-sample the computed feature maps into a second dimension of feature map;
4) filter the down-sampled maps into a second plurality of channels of feature maps with a second dimension;
5) compute each of the maps with the second dimension by rule of $\sigma(x)=\max(0,x)$, where x represents the second plurality of channels of feature maps;
6) down-sample the computed second plurality of channels feature maps into a third dimension of feature maps;

7) filter each map of the third dimension of feature maps so as to reduce high responses outside the face region, whereby, intra-identity variances of the face images are reduced and discrimination between identities of the face images are maintained.

DETAILED DESCRIPTION

Reference will now be made in detail to exemplary embodiments, examples of which are illustrated in the accompanying drawings. When appropriate, the same reference numbers are used throughout the drawings to refer to the same or like parts.

Figure 1:
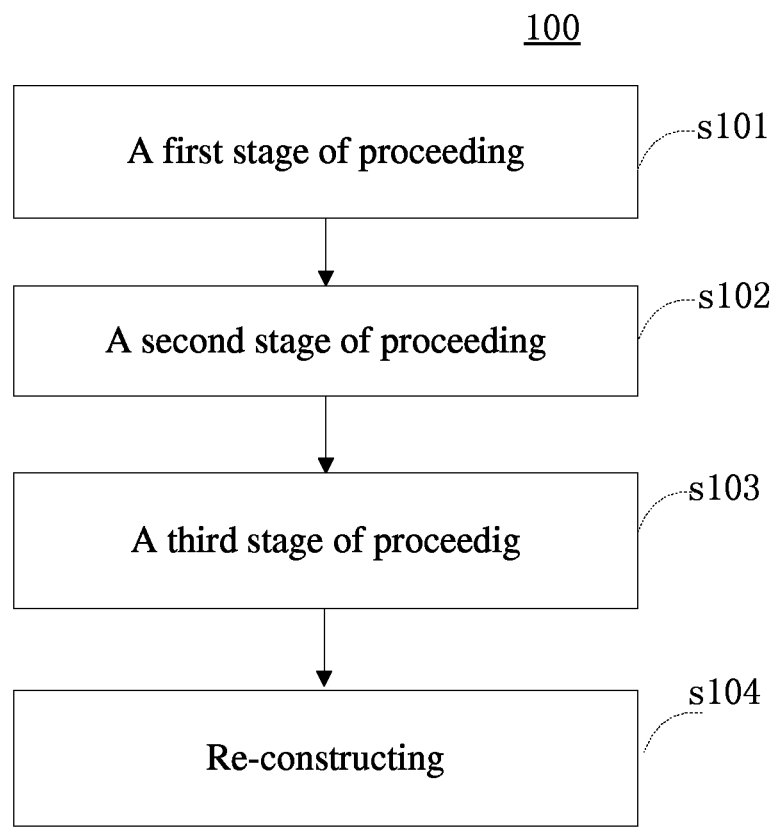
FIG. 1 illustrates a flowchart of a process for exacting face features from data of face images

FIG. 1 illustrates a flowchart of a process 100 for exacting face features from data of face images. In the process 100, face images with arbitrary pose and illumination variations of an identity will be utilized as input, and reconstructs a face in the canonical view of the same identity as the target (see FIG. 2). First, input images are encoded through feature extraction layers, which have three locally connected layers and two pooling layers stacked alternately, which will be discussed later. Each layer captures face features at a different scale. The first locally connected layer outputs a first plurality of (for example, 32) feature maps. Each map has a large number of high responses outside the face region, which mainly capture pose information, and some high responses inside the face region, which capture face structures. On the output feature maps of the second locally connected layer, high responses outside the face region have been significantly reduced, which indicates that it discards most pose variations while retain the face structures. The third locally connected layer outputs the FIP features, which is sparse and identity-preserving. The FIP features may be used to recover the face image in the canonical view.

In one embodiment, the process 100 comprises a step of s101, in which the data of face images is filtered into a first plurality of channels of feature maps with a first dimension. And then, each of the maps is computed by $\sigma(x)=\max(0,x)$, where x represents each of second dimension of feature maps. The computed maps is further down-sampled into a second dimension of feature maps. In this step, the data of face images if filtered such that each of the maps has: 1) a large number of high responses outside the face region, which mainly capture pose information of the face images, and 2) a plurality of high responses inside the face region, which capture face structures of the face images.

For example, $x^0$ represents data matrix of a face image under an arbitrary pose and illumination, which has the original dimension, for example 96×96. For purpose of description, the following is based on the original dimension of 96×96. The original dimension of data matrix $x^0$ may be filtered into 32 channels of feature maps.

In one embodiment, $x^0$ is transformed to 32 feature maps/channels through a weight matrix $W^1$ that contains 32 sub-matrices:

$$W^1=[W_1^1;W_2^1;\ldots;W_{32}^1], \forall W_i^1 \in \mathbb{R}^{n_0,n_0},$$

where $n_0$ represents the original dimension of data matrix, i.e. $n_0=96$.

Each of the sub-matrices is sparse to retain the locally connected structure of the image data. Intuitively, each row of $W_i^1$ in the sub-matrices represents a small filter centered at a pixel of $x^0$, so that all of the elements in this row equal zeros except for the elements belonging to the filter. In particular, the weights of $W^1$ are not shared, the non-zero values of these rows are not the same. Therefore, the weight matrix $W^1$ results in 32 feature maps $\{x_i^1\}_{i=1}^{32}$, each of which has $n_0$ dimensions.

Then, a matrix $V^1$, where $V_{ij} \in \{0,1\}$ is used to down-sample each of these feature map to 48×48 features in order to reduce the number of parameters need to be learned and obtain more robust features. Each $x_i^1$ of x can be computed as $$x_i^1 = V^1 \sigma(W_i^1 x^0), \quad (1)$$

where $\sigma(x)=\max(0,x)$ is the rectified linear function that is feature-intensity-invariant. So it is robust to shape and illumination variations. $x^1$ can be obtained by concatenating all the $x_i^1 \in \square^{48 \times 48}$ together, obtaining a large feature map in $n_1=48 \times 48 \times 32$ dimensions.

In one embodiment, before step s101, the process 100 may non-linearly activate the data of face images by rule of $\sigma(x)=\max(0,x)$, where x represents each of data of face images. In another embodiment, the face images may be transformed into gray level images before step s101.

In step s102, the computed each map is further filtered into a second plurality of channels of feature maps with a second dimension, and each of the filtered maps is further computed by $\sigma(x)=\max(0,x)$, where x represents each of third dimension of feature maps. And then the maps are further down-sampled into a third dimension of feature maps.

To be specific, each $x_i^1$ is filtered to $x_i^2$ with 32

$$\text{sub-matrices}\{W_i^2\}_{i=1}^{32}, \forall W_i^2 \in \square^{48 \times 48, 48 \times 48}, \quad (2)$$

$$x_i^2 = \sum_{j=1}^{32} V^2 \sigma(W_j^2 x_i^1)$$

where $x_i^2$ is down-sampled using $V^2$ to 24×24 dimensions. Eq.2 means that each small feature map in the first layer is multiplied by 32 sub-matrices and then summed together. Here, each sub-matrix has sparse structure as discussed above. We can reformulate Eq.2 into a matrix form $$x^2 = V^2 \sigma(W^2 x^1) \quad (3)$$

where $W^2=[W_1^{2'}; \ldots; W_{32}^{2'}], \forall W_i^{2'} \in \square^{48 \times 48, n_1}$ and $x^1=[x_1^1; \ldots; x_{32}^1] \in \square^{n_1}$, respectively. $W_i^{2'}$ is simply obtained by repeating $W_i^2$ for 32 times. Thus, $x^2$ has $n_2=24 \times 24 \times 32$ dimensions.

In step s103, the process 100 filters the each map of the third dimension of feature maps obtained from step s102 so as to reduce high responses outside the face region, such that intra-identity variances of face images are reduced and the discrimination between identities of the face images are maintained. The obtained face features are also called the face identity-preserving (FIP) features in the disclosures.

In one embodiment, the process 100 is used to weight each of the maps received from step s102 and transform the weighted maps to frontal face images without pose and illumination variations in step s104.

To be specific, $x^2$ is transformed to $x^3$, i.e. the FIP features. $x^3$ is the same size as $x^2$.

$$x^3 = \sigma(W^3 x^2) \quad (4)$$

Where $W^3 = [W_1^3; \ldots; W_{32}^3]$, $\forall W_i^3 \in \square^{24 \times 24, n_2}$ and $x^2 = [x_1^2; \ldots; x_{32}^2] \in \square^{n_2}$, respectively.

And then in step s106, the process 100 transforms the FIP features $x^3$ to the frontal face image y, through a weight matrix $W^4 \in \square^{n_0, n_2}$, $$y = \sigma(W^4 x^3). \quad (5)$$

The method for exacting face features from data of face images has been discussed. Hereinafter a system for exacting face features from data of face images referring to FIGS. 2 and 3, wherein FIG. 2 illustrates an architecture of the system 200 for exacting face features from data of face images in accordance with embodiments of the present application, while FIG. 3 illustrates a block view of the exemplary system 200 for exacting face features from data of face images in accordance with embodiments of the present application.

Figure 2:
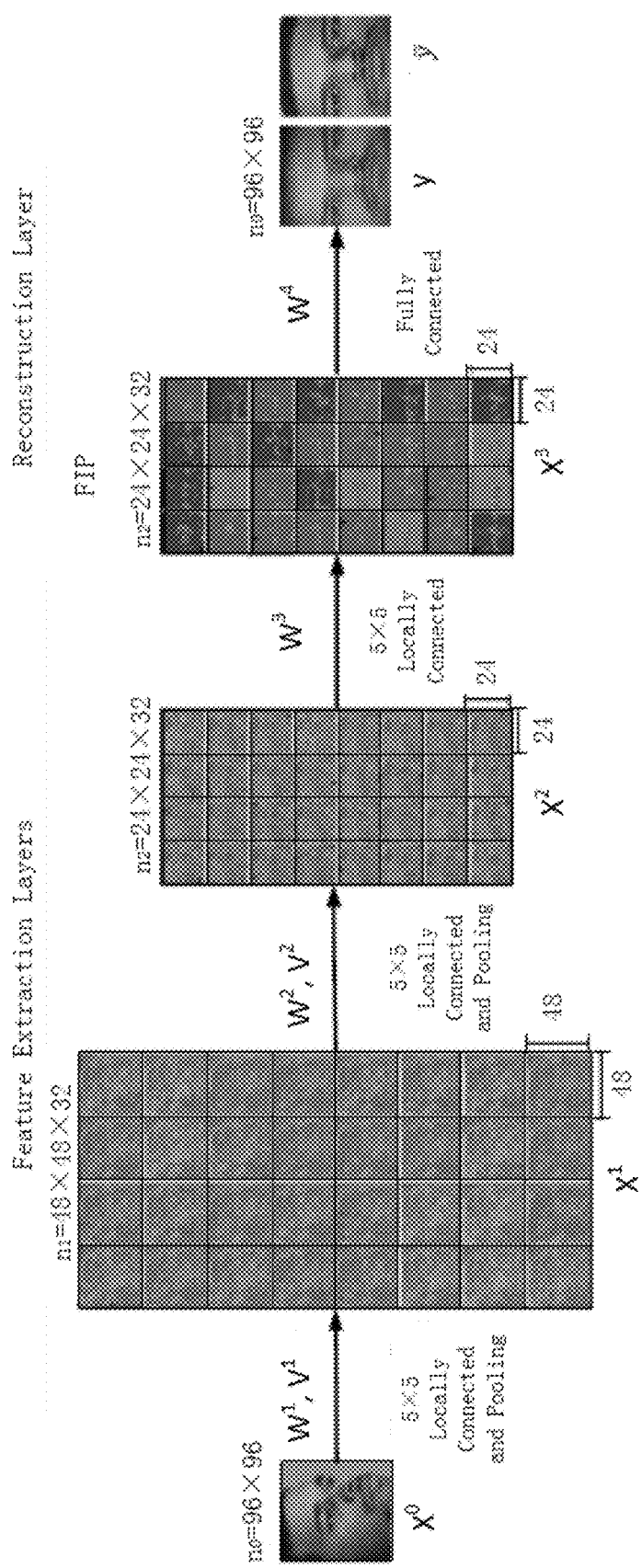
FIG. 2 illustrates an architecture of the system for exacting face features from data of face images in accordance with embodiments of the present application.

As shown in FIG. 2, the system 200 comprises features extraction layers and the features. As mentioned in the above, face images with arbitrary pose and illumination variations of an identity will be utilized as input for the system 200. The system 200 reconstructs a face in the canonical view of the same identity as the target. First, input images are encoded through feature extraction layers, which have three locally connected layers and two pooling layers stacked alternately. Each layer captures face features at a different scale. The first locally connected layer outputs a first plurality of (for example, 32) feature maps. Each map has a large number of high responses outside the face region, which mainly capture pose information, and some high responses inside the face region, which capture face structures. On the output feature maps of the second locally connected layer, high responses outside the face region have been significantly reduced, which indicates that it discards most pose variations while retain the face structures. The third locally connected layer outputs the FIP features, which is sparse and identity-preserving. The FIP features may be used to recover the face image in the canonical view.

Figure 3:
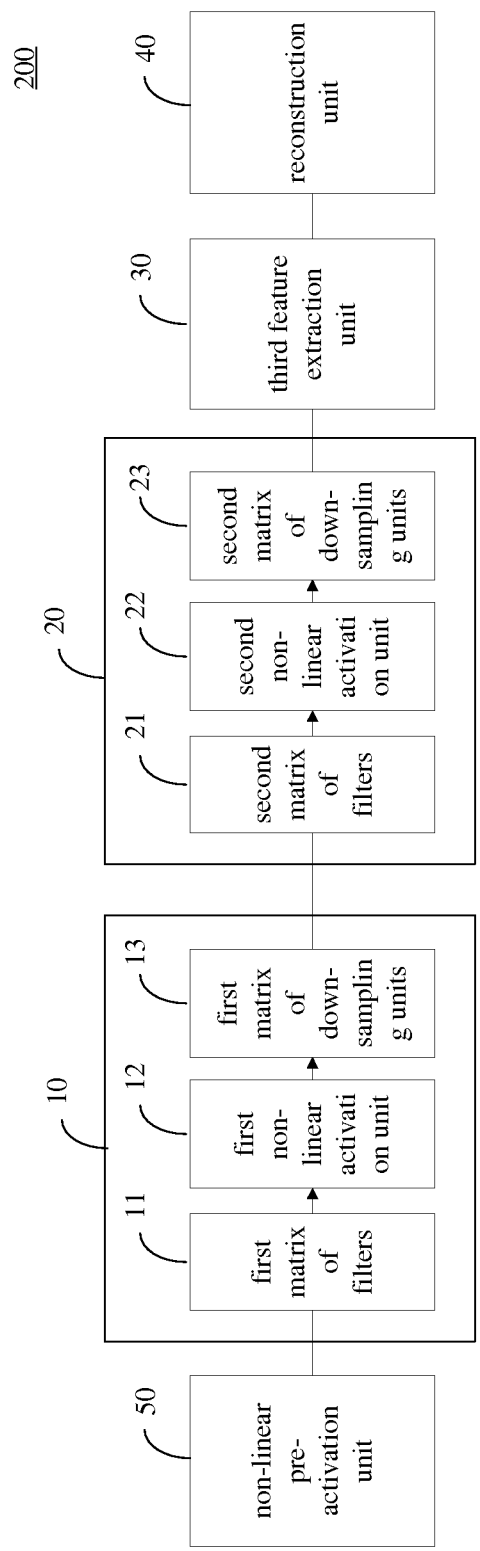
FIG. 3 illustrates a block view of the exemplary system for exacting face features from data of face images in accordance with embodiments of the present application.

More specifically, as shown in FIG. 3, the system 200 may comprise a first feature extraction unit 10, a second feature extraction unit 20, a third feature extraction unit 30. The first feature extraction unit 10 is configured to filter the data of face images into a first plurality of channels of feature maps with a first dimension and down-sample the feature maps into a second dimension of feature maps. The second feature extraction unit 11 is configured to filter the second dimension of feature maps into a second plurality of channels of feature maps with a second dimension, and to down-sample the second plurality of channels feature maps into a third dimension of feature maps. And the third feature extraction unit 12 is configured to filter the third dimension of feature maps so as to further reduce high responses outside the face region such that reduce intra-identity variances of face images, while maintain discrimination between identities of the face images.

As shown in FIG. 3, the system 200 further comprises a first non-linear activation unit 20 arranged between the first feature extraction unit 10 and the second feature extraction unit 11, and a second non-linear activation unit 21 arranged between the second feature extraction unit 11 and the third feature extraction unit 12. The first and the second non-linear activation units are configured to Non-linearly couple the first, the second and the third feature extraction units, respectfully by rule of $\sigma(x) = \max(0, x)$, where x is the extracted feature maps.

In one embodiment, the first feature extraction unit 10 comprises a first matrix of filters 11, a first non-linear activation unit 12; and a first matrix of down-sampling units 13. The first matrix of filters 11 are configured to filter the data of face image such that each of the maps has a large number of high responses outside the face region, which mainly capture pose information of the face image, and a plurality of high responses inside the face region, which capture face structures of the face image. The first non-linear activation unit 12 is configured to non-linearly couple the first matrix of filters 11 and the first matrix of down-sampling units 13. The first matrix of down-sampling units 13 are configured to down-sample the feature maps into the second dimension of feature maps. The first matrix of filters 11, the first non-linear activation unit 12; and the first matrix of down-sampling units 13 cooperate to proceed with said functions in accordance with the rule of formula (5), as stated in the above.

The second feature extraction unit 20 comprises a second matrix of filters 21, a second non-linear activation unit 22 and a second matrix of down-sampling units 23. The second matrix of filters 21 are configured to filter each of the maps from the first feature extraction unit so as to reduce high responses outside the face region such that most pose variations are discarded while the face structures of the face image is retained. The second matrix of down-sampling units 23 configured to down-sample the feature maps into the second dimension of feature maps. The second non-linear activation unit 22 is configured to non-linearly couple the second matrix of filters 11 and the second matrix of down-sampling units 23. The second matrix of filters 21, the second non-linear activation unit 22 and the second matrix of down-sampling units 23 cooperate to proceed with the above mentioned functions in accordance with the rule of formulas (2)-(4), as stated in the above.

In addition, the system 200 may further comprise a reconstruction unit 40 configured to weigh each of features received from the third feature extraction unit 30, and transform the weighted features to frontal face images without pose and illumination variations by rule of formula (5) as stated in the above.

Furthermore, in one embodiment, the system 200 may further comprises a non-linear pre-activation unit 50 configured to proceed with the data of face images before they are input to the first feature extraction unit. The unit 50 may further configured to transform the image into the grayscale image.

The processes of filtering in the three layers (i.e. steps S101-103, units 10-20) are carried out with a first weight matrix W1, a second weight matrix W2, a third weight matrix W3, respectively, and the transforming is carried out with a fourth weight matrix W4. The present application devises a supervised method based on the least square dictionary learning. In particular, the matrices W1, W2, W3 and W4 are trained by initializing parameters of W1, W2, W3 and W4 based on a least square dictionary learning, and then updating all the parameters by back-propagating the summed squared reconstruction error between the reconstructed image and a ground truth.

Figure 4:
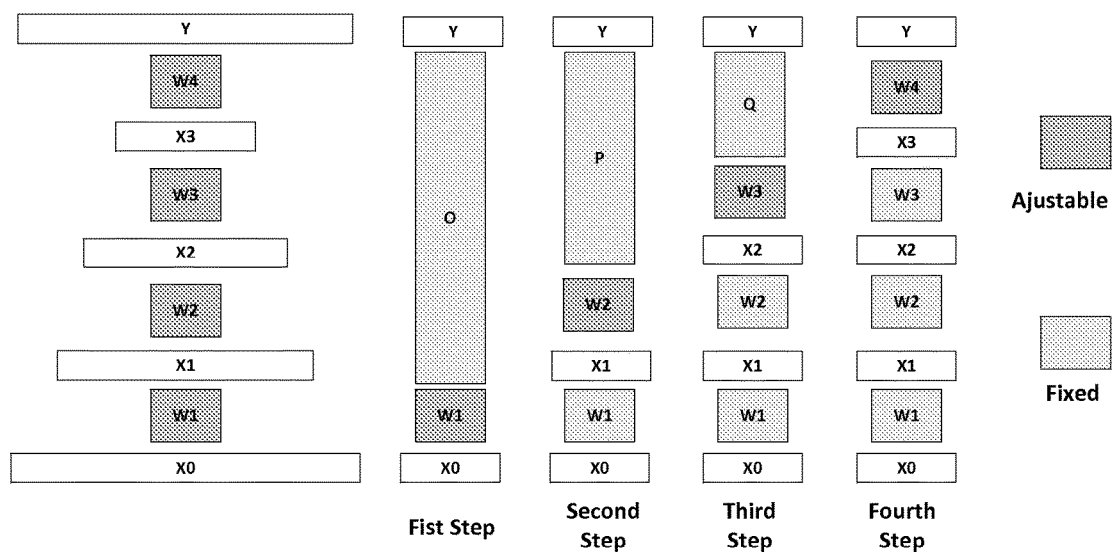
FIG. 4 illustrates a flow of training the parameters in the weights according to one embodiment of the present application.

FIG. 4 illustrates a flow for initializing parameters of W1, W2, W3 and W4. Given $X^3 = \{x_i^3\}_{i=1}^m$ are a set of FIP features and $\overline{Y}=\{\overline{y}_i\}_{i=1}^m$ are a set of target images, where m denotes the number of training examples, in first step, providing a fixed matrix O, initializing W1 with X0 and Y by rule of $$\arg\min_{W^1} \|\overline{Y}-OW^1X^0\|_F^2 \qquad (6)$$

where $X^0=\{x_i^0\}_{i=1}^m$ is a set of input images, and $\|\cdot\|_F$ is the Frobenius norm.

In the second step, the method provides a fixed matrix P to initialize W2 with W1X0 and Y by rule of $$\arg\min_{W^2} \|\overline{Y}-PW^2X^1\|_F^2 \qquad (7)$$

wherein W1 is fixed,

In the third step, the method provides a fixed matrix Q to initialize W3 with W2W1X0 and Y by rule of $$\arg\min_{W^3} \|\overline{Y}-QW^3X^2\|_F^2. \qquad (8)$$

In the fourth step, the method initializes W4 with W3W2W1X0 and Y by rule of $$\arg\min_{W^4} \|\overline{Y}-W^4X^3\|_F^2. \qquad (9)$$

For the updating, the proposed method updates all the weight matrices after the initialization by minimizing the loss function of reconstruction error $$E(X^0;W)=\|\overline{Y}-Y\|_F^2, \qquad (10)$$

where $W=\{W^1,\ldots,W^4\}$. $X^0=\{x_i^0\}$, $\overline{Y}=\{\overline{y}_i\}$, and $Y=\{y_i\}$ are a set of input images, a set of target images, and a set of reconstructed images, respectively. It updates W using the stochastic gradient descent, in which the update rule of $W^i$, i=1 ... 4, in the k-th iteration is $$\Delta_{k+1} = 0.9\cdot\Delta_k - 0.004\cdot e\cdot W_k^i - e\cdot\frac{\partial E}{\partial W_k^i}, \qquad (11)$$

$$W_{k+1}^i = \Delta_{k+1} + W_k^i, \qquad (12)$$

where $\Delta$ is the momentum variable, ò is the learning rate, and $$\frac{\partial E}{\partial W^i} = x^{i-1}(e^i)^T$$

is the derivative, which is computed as the outer product of the back-propagation error e' and the feature of the previous layer $x^{i-1}$. In our deep network, there are three different expressions of $e^i$. First, for the transformation layer, $e^4$ is computed based on the derivative of the linear rectified function $$e_j^4 = \begin{cases} [\overline{y}-y]_j, & \delta_j^4 > 0 \\ 0, & \delta_j^4 \le 0 \end{cases} \qquad (13)$$

where $\delta_j^4=[W^4x^3]_j$. $[\bullet]_j$ denotes the j-th element of a vector.

Similarly, back-propagation error for $e^3$ is computed as $$e_j^3 = \begin{cases} [W^{4T}e^4]_j, & \delta_j^3 > 0 \\ 0, & \delta_j^3 \le 0 \end{cases}, \qquad (14)$$

where $\delta_j^3=[W^3x^2]_j$.

In the disclosures, $e^1$ and $e^2$ is computed in the same way as $e^3$ since they both adopt the same activation function. There is a slight difference due to down-sampling. For these two layers, we must up-sample the corresponding back-propagation error e so that it has the same dimensions as the input feature. The present application needs to enforce the weight matrices to have locally connected structures after each gradient step. To do this, it sets the corresponding matrix elements to zeros, if they supposed to be no connections.

The embodiments of the present invention may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes. For example, the above mentioned method may be implemented by one or more processor to carry out the instructions stored in a computer-readable media.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for exacting face features from data of face images, comprising:
   1) filtering the data of face images into a first plurality of channels of feature maps with a first dimension;
   2) computing each of the maps by rule of σ(x)=max(0,x), where x represents feature maps with the first dimension;
   3) down-sampling the computed feature maps into a second dimension of feature map;
   4) filtering the down-sampled maps into a second plurality of channels of feature maps with a second dimension;
   5) computing each of the maps with the second dimension by rule of σ(x)=max(0, x), where x represents the second plurality of channels of feature maps;
   6) down-sampling the computed second plurality of channels feature maps into a third dimension of feature maps; and
   7) filtering each map of the third dimension of feature maps so as to reduce high responses outside a face region of each face image,
   whereby, intra-identity variances of the face images are reduced and discrimination between identities of the face images are maintained.

2. A method according to claim 1, wherein the step 1) further comprises:
   filtering the data of face images such that each of the maps has: a large number of high responses outside the face region, which mainly capture pose information of the face images, and a plurality of high responses inside the face region, which capture face structures of the face images.

3. A method according to claim 2, wherein the step 7) further comprises:
filtering each of the maps received from step 6) so as to reduce high responses outside the face region such that most pose variations are discarded while face structures of the face image are retained.

4. A method according to claim 3, wherein the step 7) further comprises:
weighting each of the maps received from step 6); and
transforming the weighted maps to frontal face images without pose and illumination variations.

5. A method according to claim 4, wherein the filtering in steps 1), 4) and 7) are carried out with a first weight matrix $W^1$, a second weight matrix $W^2$, a third weight matrix $W^3$, respectively, and the transforming is carried out with a fourth weight matrix $W^4$,
wherein the matrices $W^1$, $W^2$, $W^3$ and $W^4$ are trained by:
initializing parameters of $W^1$, $W^2$, $W^3$ and $W^4$ based on a least square dictionary learning, and
updating all the parameters by back-propagating a summed squared reconstruction error between a reconstructed image and a ground truth.

6. A method according to claim 2, wherein the step 7) further comprises:
filtering each of the maps received from step 6) to reduce high responses outside the face region, such that most pose variations are discarded while the face structures of the face image are retained.

7. A method according to claim 1, further comprising before step 1):
transforming the face images into gray level images.

8. A system for exacting face features from data of face images, comprising:
a memory storing one or more program instructions; and
a processor executing the program instructions to,
filter the data of face images into a first plurality of channels of feature maps with a first dimension and down-sample the feature maps into a second dimension of feature maps;
filter the second dimension of feature maps into a second plurality of channels of feature maps with a second dimension, and to down-sample the second plurality of channels feature maps into a third dimension of feature maps;
filter the third dimension of feature maps so as to further reduce high responses outside a face region of each face image so as to reduce intra-identity variances of face images, while maintaining discrimination between identities of the face images.

9. A system according to claim 8, wherein the processor is further configured to filter the data of face image such that each of the maps has a large number of high responses outside the face region, which mainly capture pose information of the face image, and a plurality of high responses inside the face region, which capture face structures of the face image.

10. A system according to claim 9, wherein the processor is further configured to filter each of the maps from the first feature extraction unit to reduce high responses outside the face region, such that most pose variations are discarded while the face structures of the face image is retained.

11. A system according to claim 8, wherein the processor is further configured to weight each of the maps and transform the weighted maps to frontal face images without pose and illumination variations.

12. A system according to claim 8, wherein the processor is further configured to transform the data of face images into grayscale image before they are input to the first feature extraction unit.

* * * * *